No. 677,614. Patented July 2, 1901.
J. ARMSTRONG.
APPARATUS FOR THE TREATMENT OF ORES.
(Application filed Nov. 17, 1899.)
(No Model.) 2 Sheets—Sheet 1.
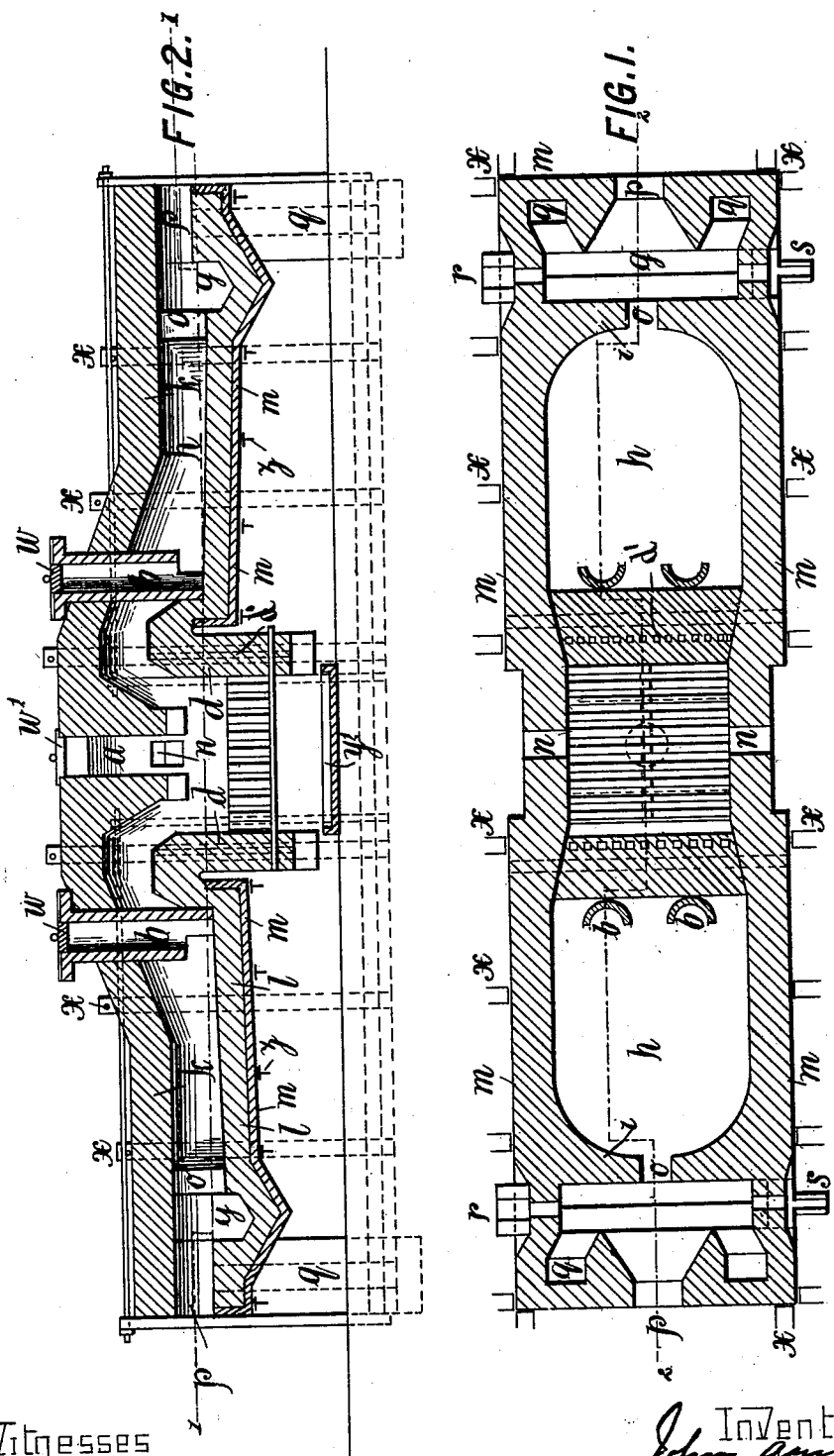
Witnesses
Inventor
John Armstrong
By Knight Bros
attys

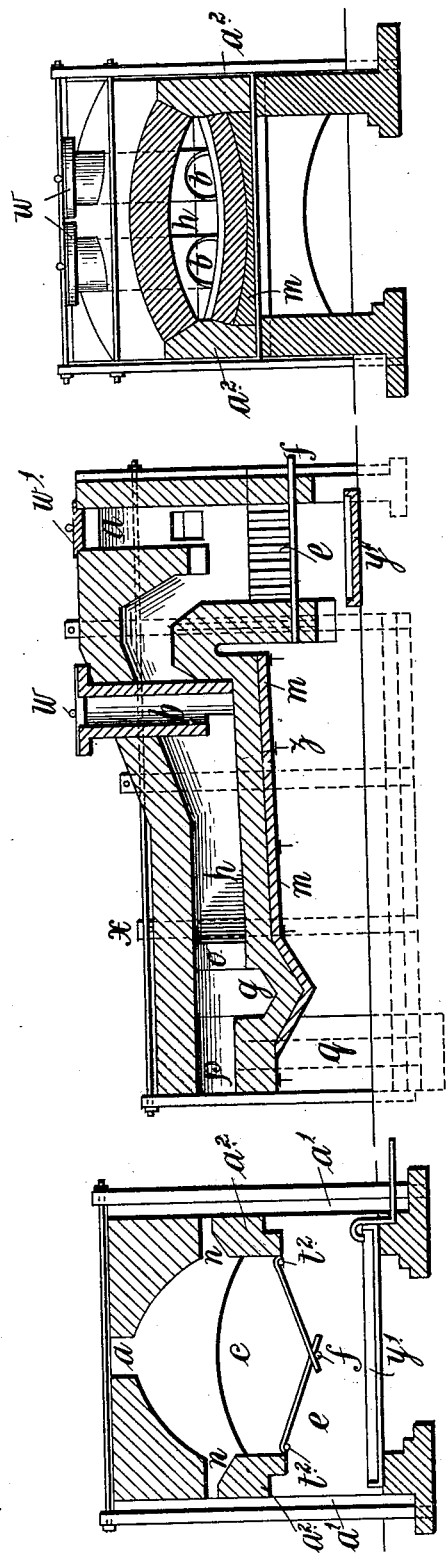

UNITED STATES PATENT OFFICE.

JOHN ARMSTRONG, OF EALING, ENGLAND.

APPARATUS FOR THE TREATMENT OF ORES.

SPECIFICATION forming part of Letters Patent No. 677,614, dated July 2, 1901.

Application filed November 17, 1899. Serial No. 737,345. (No model.)

*To all whom it may concern:*

Be it known that I, JOHN ARMSTRONG, a subject of the Queen of Great Britain, residing at Ealing, in the county of Middlesex, England, (whose post-office address is Eden Hall, Montpelier road, Ealing, in the county of Middlesex, England,) have invented certain new and useful Improvements in Apparatus for the Treatment and Reduction of Oxidized, Carbonated, or Combined Ores and in Obtaining Metals Therefrom, of which the following is a specification.

In reducing refractory ores by nascent sodium by heating said ores and in a finely-divided state intimately mixed with oxid or easily-reducible salt of sodium or potassium (such as carbonate) and carbon I have found considerable difficulty arising through oxygen entering the furnace through the furnace-door at the time of tapping, or through the grate at the time of cleaning the same, or through the fire-hole door, or the charging-door at the time of feeding in fuel or the charge. I have also found difficulty in working the invention through irregularity of depth of fuel on the furnace-grate. Further, as I use a charge highly destructive to fire-bricks and in the pulverulent form I find when the charge is poured into the furnace it flies about for a few minutes in dust, and this dust attacks the sides and roof of the furnace, rapidly fluxing the same, and this flux rapidly attaches to itself still more of the dust, thus increasing the evil until in a very short time the entire walls and roof become fused and fall.

Now this improvement has for its object the construction of the furnace so that practically no uncombined oxygen shall come in contact with the materials still being operated upon on the hearth, the depth of the fuel is kept absolutely constant, and the charge is delivered onto the bed of the furnace without any chance of it flying about.

In effecting the objects already set forth I introduce the fuel to the grate through a deep hopper above, having its bottom reaching down to the ordinary surface of the fuel and its top closed by a lid. This hopper is replenished from time to time, and the material gradually sinks down onto the hearth as the fuel on the hearth burns away. I cause the products of combustion to pass over a bridge and down on the other side and admit the light pulverulent or granular charge through another similar hopper to the one last described, at this point, the hopper filled with fuel affording a sufficient seal for the air, while the comminuted charge at the temperature of this part of the furnace greedily takes up any uncombined oxygen or one atom of oxygen in any carbonic acid, converting both into carbonic oxid. In order to prevent free oxygen entering during the cleaning out of the grate, I form the grate in the manner hereinafter set forth. Finally, in order to prevent the admission of air in a deleterious manner through the sump the latter is specially designed for this purpose, and the working door is placed close to the draft-flues Q, both of which are beyond the sump, whereby any air that enters at the working door or sump will go out through the draft-flue without entering the furnace. Consequently every part of the working of the furnace can be carried on without the admission of uncombined oxygen. This is an industrial result which, it is believed, has never been obtained in any other reverberatory furnace, while at the same time the whole action of the furnace can be viewed from the working door. The working door in other reverberatory furnaces being placed at the side cannot be opened without air at once striking the hearth. This would be of enormous injury to the Armstrong process set forth in the principal patent.

This furnace is a reverberatory furnace and is constructed as shown on the accompanying drawings and may be constructed either double, as in Figures 1 and 2, or it may be single, as in Fig. 3. The double furnace is simply two single furnaces placed end to end, and for economy in firing one fire-grate is made common to the two furnaces.

Fig. 1 is a sectional plan. Fig. 2 is a longitudinal section. Fig. 3 is the section of a single furnace, and Fig. 4 is a cross-section through the fire-grate. Fig. 5 is a cross-section through the bed of the furnace.

This furnace consists of an iron-bottomed tank constructed with plates of iron joined together in any suitable way by means of rivets or bolts and made practically water-tight, so as to avoid leakage of any materials that may be placed in it. This iron tank is shown on the drawings and marked at $m\ m$. This tank is braced and stayed together with iron backstays $x\ x$ and is also supported by bearers $z\ z$. The walls of the furnace are constructed in the ordinary way of constructing furnaces by means of refractory fire-clay, fire-brick, chemical-resisting bricks, stone blocks, or other material suitable for the substances that may be operated upon in the furnace. The walls are built from the ground sufficiently high to receive the iron tank, as shown. In the interior of the tank is then commenced the formation of the floor of the furnace $h\ h$, which is laid upon a lining of silica sand or other refractory material of a sufficient thickness to give a firm and proper bed for the bricks or other materials. This bed is made in the form of an inverted arch on a trough-shaped iron plate, so that when the floor of the furnace gets hot any substance, such as lead, being smelted in it finding its way through the joints of the floor will not be able to find a way through the bottom. The bed is made with a slope toward the sump at the ends marked $g\ g$. These ends are also constructed and formed in section, with an inverted arch for the same purpose, as just described. A bridge or dam is also formed, if necessary, as shown at $i\ i$, with an opening at $o\ o$, which may be closed with a block of refractory material if and when required. This bridge holds the melted charge in the furnace until the block of refractory material in the opening $o$ is removed. When this is done, the liquid portion of the charge runs through the opening $o$ into the sump $g$. The sump $g$ is also made with a slope on the bottom toward the tapping-hole on one side of the furnace and is provided with another tapping-hole in the other side of the furnace. These tapping-holes may be made on different levels for the purpose of tapping off material from the sump of different specific gravities. The walls of the furnace are continued above the hearth until the springing of the roof, which is formed in the shape of an arch. At the firing end of the hearth is the fire-bridge, constructed as shown at $d$ and hollow where the iron tank is made to be turned up to prevent leakage into the fire of the melted materials from the hearth. At the other end of the furnace is formed the working door, (marked $p\ p$,) where the workmen can command a view of the whole interior of the furnace and where the working door may be left open without any fear of the atmosphere being admitted to the detriment of any of the materials that may be under treatment in the interior of the furnace. The draft-flues are constructed on right and left of this working door, as at $q\ q$, which are regulated with proper dampers and are connected with a chimney-shaft. If necessary, this working door may be closed with a door.

The fire-grate is constructed either at one end, as in the single furnace, Fig. 3, or as in the double furnace, Figs. 1 and 2. The single furnace may have its bars fixed in one single row and inclined at an angle to the bridge, so that the fire-bars may be exposed to the end of the furnace, which in this case would be open at the end, or the fire-bars may be placed as shown at Fig. 4, hung from each side on bearers $t^2\ t^2$ of the furnace and each bar crossed at the lower end upon a bearer $f$. These bearers may be made hollow in the form of tubes and perforated for the purpose of conveying water or steam under the grate. The central bearer $f$ is made movable, if necessary, and may be pulled out, so that the fire may be dropped quite out, and all the bars will then hang down from the side bearers, as they are formed with a hooked end for that purpose. The object of crossing the bars is for the purpose of keeping them the proper distance apart, which is a great consideration in all furnaces, and as the ends project over the middle bearer $f$ they are accessible to the workmen to lift or shake, so that the fire is easier kept in a proper condition. The bars also may be made hollow, of tubes to convey water or steam. The side walls are in this part of the furnace completely taken away, as shown in Fig. 4 at $a'\ a'$, and the upper portion of the wall is carried on bearers $a^2\ a^2$, so that the workman can manipulate the bottom of the furnace and keep the walls $d\ d$ of the furnace, as well as the bars, quite free from accretion of clinker without disturbing the fire, and by lifting up slightly one of the bars the clinker may be dropped with a very considerable saving of labor over the present system of ordinary fire-grates. There is an inspection-hole at $n$ closed with a door. The fuel is fed in at $a$ through the hopper W, which is closed with a tight-fitting lid to keep in the gas that may be formed. This furnace is constructed as a gas-producing furnace, and may be used as a pure reducing furnace simply where the presence of free oxygen or atmospheric air or carbonic acid would be injurious, or by an arrangement of placing air-tubes in the wall of the bridge, as shown at $d\ d$, it can be used as an ordinary reverberatory furnace, where the carbonic monoxid will be burned in the passage over the bridge $d$. Should, however, the presence of the above gases or air be injurious, then the furnace is constructed as shown, but without the air-holes, when a perfect atmosphere of carbon monoxid will be produced.

In order to introduce a charge of a light or dusty nature into the furnace, as well as for the purpose of effectually excluding the atmospheric air, I place tubes or other forms of such like apertures in the roof or sides of the furnace, as is shown at $b\ b$, and made of any suitable material, such as fire-clay, and which are so constructed that the materials are introduced into the bed of the furnace without the slightest trouble or dust. These apertures or tubes may be provided with hoppers or close-fitting lids *w*. A tray for water may be placed or a well may be sunk at Y in order to receive the ash from the grate.

I declare that what I claim is—

1. In a reverberatory furnace, the combination of a grate capable of holding a considerable thickness of fuel, a charging-hopper for supplying fuel without admission of air, a bridge, a deep hopper having an opening at the bottom beyond the bridge for the admission of the pulverulent charge with the smallest practicable quantity of air, a working hearth, a sump beyond the working hearth, draft-flues beyond the sump, and the working door beyond the draft-flues whereby the air is prevented from entering either at the sump, the working hole, or the charging-orifice in deleterious quantities, as any air seeking to enter the door escapes through the draft-flues instead of entering the furnace in a direction contrary to the draft and uncombined oxygen is kept from entering at the grate or fuel-entrance.

2. In a reverberatory furnace, for use with a reducing-flame, a grate of the fire-chamber separated by a bridge from the furnace-chamber having transverse fire-bars supported alternately on each side and supported on and sloping downward to a central longitudinal bar or support and a central deep and substantially parallel-sided hopper containing fuel and having an open bottom at the normal height of the fuel in the grate and large openings in the fire-chamber walls on either side below the grate whereby the grate can be kept filled to a uniform depth and clinkering effected without admitting air, substantially as described.

3. In combination with a reverberatory furnace for working with a reducing-flame, a grate, a deep substantially parallel-sided charging-hopper over said grate, and having its lower end dipping down to the normal level of the fuel on the grate, a bridge rising above the level of the bottom of the charging-hopper, and a similar deep charging-hopper beyond the bridge for admitting the pulverulent charge, whereby no further oxygen can pass from the grate or either of the charging-hoppers when the latter are kept filled to the bed of the furnace, and the pulverulent charge is delivered quietly to the level of the grate without flying out as dust.

4. In a reverberatory furnace, the combination of the hearth $h$, the bridge $i$ having opening $o$, sump $g$ beyond, the exit-flues $q$ beyond the sump, and the working door $p$ located between and beyond the entrances to said exit-flues, whereby the working door can be kept open and all parts of the furnace stirred therefrom without danger of free oxygen entering the furnace.

5. In a reverberatory furnace the combination of the grate $e$, the bridge $d$, the hearth $h$ beyond the bridge $d$, the bridge $i$ beyond the hearth $h$, and the sump $g$ beyond the bridge $i$, draft-openings $q$ beyond the bridge $i$, and beyond these and in line with the center line of the hearth the working hole $p$, substantially as described.

6. In a reducing-furnace, the combination of the furnace-grate having transverse bars $e$ dipping down toward the center, the bridge $d$ with vertical sides and the sides of the furnace cut away below the grate whereby clinkering-bars can be passed up through the grate to clear the bridge sides of clinker without opening any door.

In witness whereof I have hereunto signed my name, this 2d day of November, 1899, in the presence of two subscribing witnesses.

JOHN ARMSTRONG.

Witnesses:
ALBERT C. B. HENRI,
JOHN McLACHLAN.